United States Patent

[11] 3,603,874

[72] Inventor William L. Posey
 Lorain, Ohio
[21] Appl. No. 831,410
[22] Filed June 9, 1969
[45] Patented Sept. 7, 1971
[73] Assignee United States Steel Corporation

[54] EDDY CURRENT INSPECTION DEVICE FOR ELONGATED MATERIAL WITH MEANS TO ELIMINATE THE END EFFECT
10 Claims, 1 Drawing Fig.

[52] U.S. Cl. .................................................. 324/40,
 324/37
[51] Int. Cl. .................................................. G01r 33/12
[50] Field of Search .................................. 324/34, 37,
 40

[56] References Cited
UNITED STATES PATENTS
2,102,451 12/1937 Zuschlag ..................... 324/37
2,415,789 2/1947 Farrow ........................ 324/40
2,942,178 6/1960 Nerwin ........................ 324/34
2,971,150 2/1961 Prindle ........................ 324/34
2,980,848 4/1961 Datt et al. .................... 324/37
3,249,861 5/1966 Pevar .......................... 324/37
3,475,681 10/1969 Nerwin, Jr. et al. ........... 324/37

Primary Examiner—Rudolph V. Rolinec
Assistant Examiner—R. J. Corcoran
Attorney—Rea C. Helm ABSTRACT: A control circuit for eddy current inspection of moving lengths of steel pipe has continuously energized primary encircling coils inducing eddy currents in the pipe. When a length of pipe enters the two encircling sensing coils, which detect differences in eddy currents as material discontinuities, the first sensing signals are attenuated. A defect-marking system, which marks according to the location of sensed material discontinuities, excludes the signals resulting from the entrance and exit of the pipe through the coils.

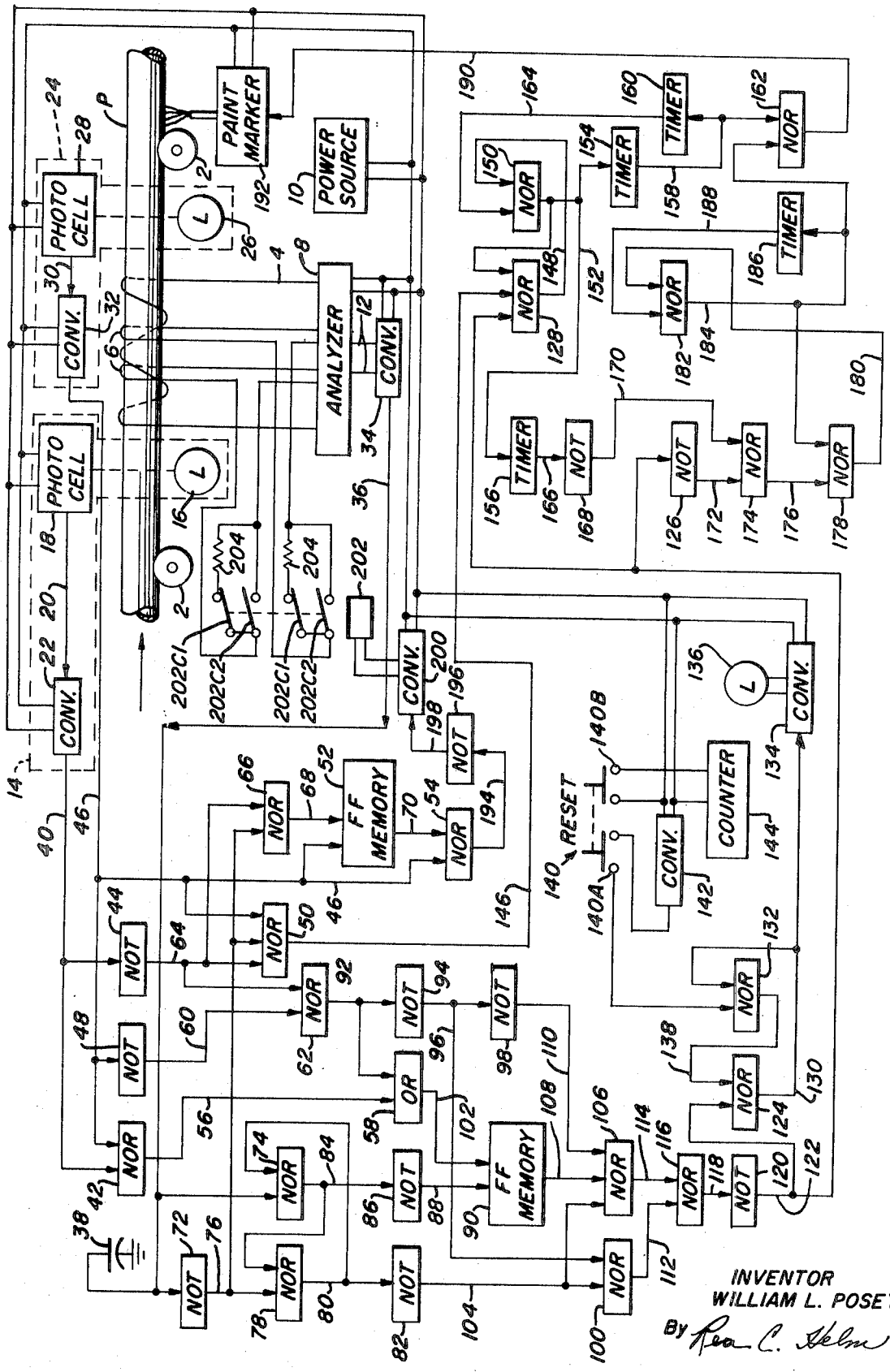

EDDY CURRENT INSPECTION DEVICE FOR ELONGATED MATERIAL WITH MEANS TO ELIMINATE THE END EFFECT

This invention relates to circuitry for controlling eddy current inspection and, more particularly, to a control circuit for eddy current inspection for defects in steel pipe which eliminates unwanted end signals, attenuates the entry signal and actuates a defect marker.

Elongated ferromagnetic material, such as steel pipe, may be inspected for material discontinuities by measuring the change in eddy currents induced in the workpiece as it passes through a magnetic field. A length of pipe is conveyed longitudinally through a primary encircling coil which induces circulating eddy currents in the pipe. Two parallel closely spaced sensing coils provide signals induced by the eddy current. If there is a difference between the magnitude or phase of the two signals as the pipe passes through the coils, there is a discontinuity in the pipe wall or weld. The difference signal is then used to actuate a marker to identify the defect location or otherwise classify the length of pipe.

The ends of the pipe develop a defect signal of such magnitude and duration as to obscure a signal from a nearby defect if the primary coil is continuously energized during a test. Thus the first 15 to 20 inches and the last 6 inches of a length of pipe is not inspected.

By using proximity switches to sense the ends of the pipe and a timer, the primary coil can be turned on after the entry end of the pipe has passed the sensing coils. This reduces the lost inspection area to within 10 to 12 inches of the entry end but requires excessive timer maintenance and adjustments. If the pipe is to be used for a critical application, the ends must then be cropped or inspected again as, for example, by a manual radiograph.

When a defect is sensed, a paint spray is actuated, but since it is impractical to locate the paint spray at the sensing coils, the accuracy of the marking is impaired. Marks are therefore made long enough to cover the defects. If more than one defect occurs within the length of the mark, complex stacked memory units are required for all predictable number of defects so that all defects are marked within the mark range.

It is, therefore, an object of my invention to provide a control circuit for eddy current inspection that is continuously energized and rejects the signals caused by the ends of the workpiece.

Another object is to provide such a circuit that inspects close to the ends and reduces crop length.

Still another object is to provide such a circuit that eliminates subsequent manual end testing.

A further object is to provide such a circuit that recognizes and marks closely spaced defects.

A still further object is to provide such a circuit that does not require the defect marker to be located close to the sensing coils.

These and other objects will become more apparent after referring to the following specification and attached drawing, in which:

The single figure is a schematic diagram of my invention.

Referring now to the drawing, reference letter P represents a length of pipe, part of which is shown, supported on grooved rollers 2 which are driven by motors (not shown) in the direction of the arrow. A primary encircling coil 4 and two sensing encircling coils 6 are located so that pipe P passes through the coils which are connected to analyzer 8. Analyzer 8 energizes coil 4 and is connected to a 110 v., 60 cycle power source 10 and also provides 110 v. 60 cycle voltage output 12 when a defect in pipe P is sensed. Analyzer 8 may be an Eddy Current Tester Model 1-63 single frequency type 2 SF manufactured by Magnetic Analysis Corporation, Mt. Vernon, New York. This is conventional eddy current testing equipment with output 12 connected to actuate a defect identification system or a pipe classification system.

An entry proximity switch 14, sensing the presence of the pipe entering the encircling coils, has a light source 16 which impinges on a conventional photocell 18 when pipe P is not present. Output 20 of photocell 18 is connected to a converter 22 to provide a logic 1 output (−20 v.) when a pipe is between light 16 and photocell 18. Converter 22 is a model TYN 2 signal converter manufactured by Square D Company, part of the NOR logic system described in Square D Company product data bulletins M-212-1 and M-280-A used throughout this description. An exit proximity switch 24, sensing the pipe leaving the encircling coil has a light 26, photocell 28, photocell output 30, converter 32 and logic output connected in the same manner as entry proximity switch 14.

Output 12 of analyzer 8 is connected to a type TYN 2 converter 34 to provide a defect signal 36 which is shaped by capacitor 38. An output 40 of converter 22 is connected to an input of a NOR gate 42 and a NOT gate 44. An output 46 of converter 32 is connected to an input of gate 42, an input of a NOT gate 48, an input of a NOR gate 50, a reset input to a flip-flop memory unit 52 and an input of a NOR gate 54. An output 56 of gate 42 is connected to an input of a diode OR gate 58. An output 60 of gate 48 is connected to an input of a NOR gate 62. An output 64 of gate 44 is connected to an input of gate 62, an input of gate 50 and an input of a NOR gate 66. An output 68 of gate 66 is connected to an input of memory 52 and an output 70 of memory 52 is connected to an input of gate 54.

Defect signal 36 is connected to an input of a NOT gate 72 and an input of a NOR gate 74. An output 76 of gate 72 is connected to an input of a NOR gate 78 and inputs of gates 50 and 66. An output 80 of gate 78 is connected to gate 74 and an input of a NOT gate 82. An output 84 of gate 74 is connected to an input of gate 78 and an input of a NOT gate 86. An output 88 of gate 86 is connected to an input of a flip-flop memory unit 90.

An output 92 of gate 62 is connected to an input of gate 58 and an input of a NOT gate 94. An output 96 of gate 94 is connected to an input of a NOT gate 98 and an input of a NOR gate 100. An output 102 of gate 58 is connected to a reset input of memory 90. An output 104 of gate 82 is connected to an input of gate 100 an input of a NOR gate 106. An output 108 of memory 90 and an output 110 of gate 98 are connected to inputs of gate 106. An output 112 of gate 100 and an output 114 of gate 106 are connected to inputs of a NOR gate 116. An output 118 of gate 116 is connected to an input of a NOT gate 120. An output 122 of gate 120 is connected to an input of a NOR gate 124, to an input of a NOT gate 126, and to an input of a NOR gate 128.

An output 130 of gate 124 is connected to an input of a NOR gate 132 and to a converter 134 which is powered by source 10 and turns on a lamp 136 when output 130 is at logic 1. An output 138 of gate 132 is connected to an input of gate 124.

A reset push button 140 has a first contact 140A connecting a converter 142, which provides a −20 v. output (logic 1), to an input of gate 132. A second contact 140B of reset push button 140 connects a counter 144 to power source 10 to accumulate a count for each time contacts 140A and 140B are closed. An output 146 of gate 50 is connected to an input of gate 128. An output 148 of gate 128 is connected to an input of a NOR gate 150. An output 152 of gate 150 is connected to an input of gate 128, to the input of a spacing timer 154, which provides an output 158 after a delay, and to the input of a half-spray-length timer 156. An output 158 of timer 154 is connected to the input of a spray length timer 160 and to an input of a NOR gate 162. An output 164 of timer 160 is connected to an input of gate 150.

An output 166 of timer 156 is connected to an input of a NOT gate 168. An output 170 of gate 168 and an output 172 of gate 126 are connected to inputs of a NOR gate 174. An output 176 of gate 174 is connected to an input of a NOR gate 178. An output 180 of gate 178 is connected to an input of a NOR gate 182.

An output 184 of gate 182 is connected to an input of gate 178, to an input of gate 162 and to an input of a long duration timer 186. An output 188 of timer 186 is connected to an input of gate 182. An output 190 of gate 162 s connected to a paint marker 192. Marker 192 is powered by source 10 and is a conventional Servo operated paint spray gun adapted to spray paint on pipe P in response to the duration of the logic 0 signal 190.

An output 194 of gate 54 is connected to an input of a NOT gate 196. An output 198 of gate 196 is connected to a converter 200. Converter 200 is connected to source 10 and energizes a relay coil 202 in response to a logic 1 signal 198. Relay 202 has two normally open contacts 202C connecting sensing coils to analyzer 8 and two normally closed contacts 202C1 which connect the resistances 204 between coils 6 and analyzer 8.

In operation, power source 10 energizes analyzer 8, proximity switches 14 and 24, paint marker 192, the converters, and the logic elements, the connections to the logic elements not being shown. With no pipe in the inspection system, proximity outputs 40 and 46 and defect output 36 are at logic 0. In this condition, that part of the circuit which eliminates unwanted end signals has logic outputs as follows:

| 0 | 1 |
|---|---|
| 80 | 56 |
| 88 | 60 |
| 92 | 64 |
| 110 | 76 |
| 112 | 84 |
| 114 | 96 |
| 122 | 102 |
|  | 104 |
|  | 108 |
|  | 118 |

Another part of the circuit which attenuates the end signal has logic outputs as follows:

| 0 | 1 |
|---|---|
| 68 | 194 |
| 70 |  |
| 198 |  |

In this condition, relay 202 is deenergized and there is attenuation of the signals from coils 6. Another part of the circuit, the reset and counter circuit has logic outputs as follows:

| TATE 0 | 1 |
|---|---|
| TATE 130 | 138 |
| 140A |  |

In this condition lamp 136 is not on. A defect mark circuit has logic outputs as follows:

| 0 | 1 |
|---|---|
| 152 | 148 |
| 158 | 170 |
| 164 | 180 |
| 166 | 190 |
| 176 |  |
| 184 |  |
| 188 |  |

In this condition, the paint marker 192 is not actuated. A test identification mark circuit is not activated and has logic output 146 to 0.

If analyzer 8 supplies a defect signal, logic 1 on the output 36, this would be in error since no pipe is in the tester, and should not result in actuating the defect marker circuit. Under this condition, logic outputs would change as follows:

| 0 | 1 |
|---|---|
| 80 | 76 |
| 88 | 84 |
|  | 104 | but output 122 would not change and marker 192 would not be actuated.

When a length of pipe enters the tester, entry proximity switch 14 is energized providing a logic 1 on output 40. At this time, the first signals sensed by coils 6 will be the end of the pipe. This signal should be attenuated so that it will not obscure potentially closely following defect signals, it should be ignored by the defect marker circuit, and it should be used to mark the entry end of the pipe to indicate that it has been inspected.

When the pipe entry end is sensed by coils 6, output 36 changes to logic 1. Logic outputs change as follows:

| 0 | 1 |
|---|---|
| 56 | 80 |
| 64 | 88 |
| 76 |  |
| 84 |  |
| 102 |  |

Memory unit output 108 changes to logic 1 at the trailing edge of the pulse. Output 144 remains at 0 and defect signal 122 does not change. At the trailing edge of the pulse from output 36, output 68 changes to 0 which changes output 70 to 1. This energizes relay 202 removing resistances 204 from the sensing coil circuit. The pulse from output 36 also changes output 146 to 1 which activates the paint marker to paint the end of pipe only, which indicates that it has been inspected. Logic outputs change sequentially as follows:

| 0 | 1 |
|---|---|
| 148 |  |
|  | 152 |
|  | 158 (which changes to 1 only after timer 154 times out which is the time for the pipe end to travel from sensing coil 6 to marker 192 at inspection speed) |
| 190 (after timer 154 times out) |  |
|  | 164 (which changes to 1 only after timer 160 times out which is the time the spray is on, or the length of the mark at inspection speed with signal 36 timed for the center of the mark) |

| 0 | 1 |
|---|---|
| 152 (after timer 160 times out) |  |
| 158 (after timer 154 times out) |  |
|  | 190 (after timer 160 times out) |

Because of timers 154 and 160, half the mark length would be sprayed on the end of the pipe. Since this is close to the length of pipe that is not inspected and is cropped, the mark cannot be mistaken for a defect. Defects would be marked with a longer mark.

With the end of the pipe now past the sensing coils but not as far as the exit proximity switch 24, if a defect occurs, it is desired to mark the pipe. If a defect occurs signal 36 changes a second time and logic outputs change as follows from the condition of attenuating the end and marking the end:

| 0 | 1 |
|---|---|
| 108 | 114 |
| 118 | 122 |

This actuates the paint marker 192 in a manner already described.

Should another defect now occur, that is, after the end signal but before the pipe end reaches the exit proximity switch 24, it will be desirable to mark this defect also. So long as output 102 is at 0, the gate of memory unit 90, output 122 will be at 1 to mark the pipe each time output 88 goes from 1 to 0.

If the second defect occurs so close to the first defect that it would normally be covered by the length of spray as timed by timer 160, there is no need to extend the paint spray mark. This would occur within the trailing half of the mark since the timers are set to center the defect in the mark. Timer 156 is therefore set to time out in half the time of timer 160.

If a second defect should occur after timer 156 has timed out, it is desirable to extend the mark to cover the defect until such time as the circuit can be reset and start another normal marking sequence. This is accomplished by the change in logic outputs as follows upon the arrival of a second defect and after timer 156 has timed out:

| 0 | 1 |
|---|---|
| 170 | 168 |
| 172 | 176 |
| 180 | 184 |
| 188 | |

Thus when output 184 changes to 1, output 190 changes to 0 and a mark is being made. Timer 186 is set to time out the time required for a half spray length plus the time of timer 154. Thus any combination of defects would be conveyed by a mark. So long as the paint marker is reasonably close to the sensing coils, the extended marks are not excessively long.

When the pipe end moves to the exit proximity switch 24 logic outputs change as follows:

| 0 | 1 |
|---|---|
| 60 | 46 |
| 96 | 92 |
|  | 102 |
|  | 110 |

When defects now occur, input 102, the gate to memory unit 90, keeps output 108 at 1 for each change in output 36. Thus output 114 remains at 0. When signal 36 changes to 1, logic outputs change as follows:

| 0 | 1 |
|---|---|
| 76 | 80 |
| 84 | 112 |
| 104 | 122 |
| 118 | |

When signal 122 changes to 1, the defect is marked as already described.

In addition to marking each defect after the exit proximity switch 24 closes, changing signal 46 to 1 keeps signal 142 at 0 and signal 194 at 1 for the remainder of the length of pipe as it passes through the tester. Thus the end marker and end signal attenuation do not operate until the next test piece.

As the pipe leaves the tester, entry proximity switch 14 is uncovered and logic outputs change as follows:

| 0 | 1 |
|---|---|
| 88 | 64 |
| 102 | 96 |
| 110 | |

Should a defect signal 36 now appear it should not be acted upon. If such signal does appear, logic outputs change as follows:

| 0 | 1 |
|---|---|
| 76 | 36 |
| 84 | 80 |
| 104 | 88 |
| 112 | 118 |
| 114 | |
| 122 | |

Thus with signal 122 at 0, no mark is made. If the first defect signal after proximity switch 14 is uncovered is the end of the pipe, it is not desired to mark the end of the pipe and the end signal is eliminated. If this first defect signal is a defect, it it desired to mark the pipe. Under this condition, an end signal will occur after the defect signal and since the spacing between the entry proximity switch 14 and the sensing coil 6 is included in the paint mark length, the end signal or a second defect signal can be used to mark the pipe. When a second signal 36 occurs, either an end signal or a defect signal, output 108 of memory unit 90 will change from 1 to 0. Logic outputs change as follows:

| 0 | 1 |
|---|---|
| 108 | 114 |
| 118 | 122 |

Marker 192 is actuated to mark the defect.

Each time output 122 changes to 1, output 130 changes to 0, which lights warning lamp 136 for the operator's attention. The lamp will not light on an end signal or an end mark signal. By closing the reset push button 140, a logic 1 is provided to gate 132 and records a defect in counter 144. Output 130 changes to 0 turning off lamp 132.

Capacitor 38 serves to stretch the spike produced from output 12 into a pulse more suitable in the logic system. It also tends to eliminate the double end signals that some sizes of pipe create. It minimizes spurious signals caused by other than horizontal movement of the pipe through the sensing coils 6.

Proximity switches 14 and 24 should be close to the sensing coils, preferably within a half mark length to insure integrity of marking on pipe ends.

While logic NOR elements have been described in my control circuit, it is obvious that other logic systems or relays could be used to provide the same functions. Timers may be adjustable for inspection speed changes.

The signals resulting from the entrance end of the pipe passing through the sensing coils has been shown as attenuated by resistance, but the same result may be achieved by clipping the signals from the sensing coil to bring the signals within the desired signal-to-noise range of analyzer 8.

I claim:

1. In apparatus for the nondestructive eddy current inspection of elongated ferromagnetic material including an energized primary encircling coil through which lengths of material pass with eddy currents being induced in the material, two spaced-apart encircling sensing coils through which said lengths of material pass whereby said sensing coils sense differences in eddy currents as material discontinuities caused by material defects and the material ends pass through the sensing coils, an indicator and means connected to said sensing coils and responsive to said differences for providing a signal to said indicator; an improved control circuit comprising means adjacent said encircling coils for detecting the presence of said material prior to the entrance of said material into said encircling coils and generating a signal indicative of said presence, and means connected to said detecting means and said signal providing means and responsive to the signal indicative of the entrance end of a length of material passing said detecting means and also responsive to the signal caused by said end entering said sensing coils and the combined reception of said signals for disconnecting the signal providing means from said indicator for only the next subsequent sensing of the sensing coils after the entrance end has been detected by said detecting means.

2. Apparatus according to claim 1 which includes means connected to said detecting means and said signal providing means and responsive to the signal generated by the exit end of a length of material passing said detecting means for disconnecting the signal providing means from said indicator for only the next subsequent sensing of the sensing coils after said exit end has been detected by said detecting means.

3. Apparatus according to claim 2 which includes means connected to said signal providing means for providing only a single signal when said coils sense an end of tubular material.

4. Apparatus according to claim 2 which includes means connected to said detecting means and responsive to the entrance end of a length of material passing said detecting means for diminishing the magnitude of only the next subsequent single sensing of each sensing coil.

5. Apparatus according to claim 4 in which the means for diminishing the magnitude of only the next subsequent single sensing of each sensing coil includes circuit means connected to said sensing coils for clipping said sensings.

6. Apparatus according to claim 4 in which the means for diminishing the magnitude of said sensings includes a first resistance, a second resistance, means for connecting the first resistance to one sensing coil and the second resistance to the other sensing coil before material enters the sensing coils, and means responsive to the end of said sensings for disconnecting said resistance whereby said resistances attenuate said sensings.

7. Apparatus according to claim 6 which includes means connected to said signal providing means and spaced from said coils adjacent the travel path of said lengths of material for placing a longitudinal mark on said length centered on the location on which the differences were sensed.

8. Apparatus according to claim 7 which includes means connected to said signal providing means for disconnecting the signal providing means from the marking means upon the occurrence of each subsequent sensing while a mark is being placed on said material.

9. Apparatus according to claim 8 which includes means for extending the length of said mark a distance equal to the spacing between said sensing coils and the center of said marking means upon the subsequent occurrence of a sensing occurring during the time from the occurrence of a sensing to the completion of its associated mark.

10. Apparatus according to claim 9 which includes means responsive to the signal resulting from the entrance end of a length of material passing through the sensing coils for marking the entrance end of said length of material with a longitudinal mark, an indicating lamp, a power source, means responsive to the marking of a length of material for connecting said power source to said indicating lamp, a counter, and manual reset means to disconnect said lamp from said power source and record a count in said counter.

UNITED STATES PATENT OFFICE
CERTIFICATE OF CORRECTION

Patent No. 3,603,874                     Dated    September 7, 1971

Inventor(s)    William L. Posey

It is certified that error appears in the above-identified patent and that said Letters Patent are hereby corrected as shown below:

Column 2, line 33, after "connected" insert -- to an input of --. Column 3, line 4, "s" should read -- is --; line 14, after "coils" insert -- 6 --; line 47, before "O" cancel "TATE"--; line 48, before "130" cancel "TATE"; line 62, "to" should read -- at --. Column 4, line 17, "144" should read -- 114 --; line 22, before "pipe" insert -- the --. Column 5, line 19, "conveyed" should read -- covered --. Column 6, line 74, after "said" insert -- sensing --.

Signed and sealed this 1st day of August 1972.

(SEAL)
Attest:

EDWARD M. FLETCHER, JR.
Attesting Officer

ROBERT GOTTSCHALK
Commissioner of Patents